Figure 3:
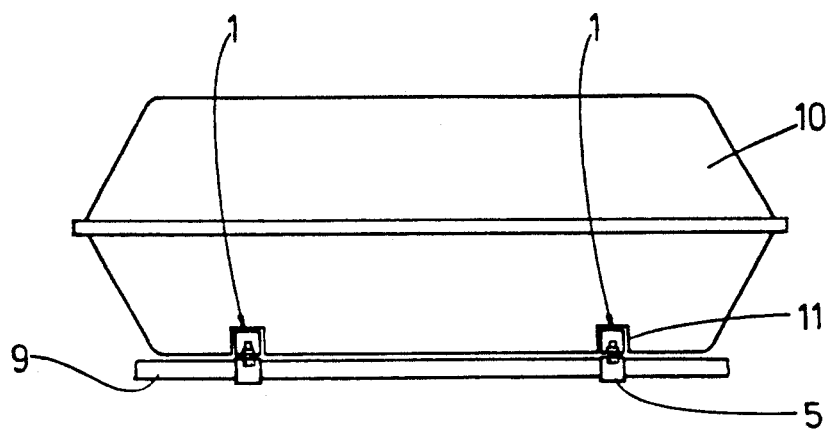

United States Patent [19]
Kvänna

[11] Patent Number: 5,181,639
[45] Date of Patent: Jan. 26, 1993

[54] SKI BOX ATTACHMENT

[75] Inventor: Klas-Göran Kvänna, Mora, Sweden

[73] Assignee: AB Formplast, Sweden

[21] Appl. No.: 761,361

[22] PCT Filed: Mar. 2, 1990

[86] PCT No.: PCT/SE90/00140
§ 371 Date: Aug. 30, 1991
§ 102(e) Date: Aug. 30, 1991

[87] PCT Pub. No.: WO90/10556
PCT Pub. Date: Sep. 20, 1990

[30] Foreign Application Priority Data
Mar. 7, 1989 [SE] Sweden ................... 8900798

[51] Int. Cl.$^5$ .............................................. B60R 9/00
[52] U.S. Cl. ......................... 224/328; 224/321; 224/319
[58] Field of Search ............ 224/321, 328, 326, 325, 224/324, 309, 310, 319, 329, 330, 331

[56] References Cited

U.S. PATENT DOCUMENTS

| | | | |
|---|---|---|---|
| 3,366,295 | 1/1968 | Nygaard | 224/319 |
| 4,217,999 | 8/1980 | Forsman | 224/319 |
| 4,342,411 | 8/1982 | Bott | 224/319 |
| 4,428,517 | 1/1984 | Bott | 224/319 |

FOREIGN PATENT DOCUMENTS

| | | |
|---|---|---|
| 0187742 | 5/1989 | European Pat. Off. |
| 3221126 | 12/1983 | Fed. Rep. of Germany |
| 3409609 | 9/1985 | Fed. Rep. of Germany |

OTHER PUBLICATIONS

Technical Manual-Thule 1987-1988 (p. 46).
Spare Parts Thule (p. 13).
B34-B38 1 page support bracket arrangements.
B9, B11, B14, B23-B27 1 page support bracket arrangements.
Monteringsanvisning-1 page, 1982.
Monteringsanvisning-1 page, 1982.

*Primary Examiner*—Linda J. Sholl
*Attorney, Agent, or Firm*—Young & Thompson

[57] ABSTRACT

Apparatus is provided for attaching a ski-box to a roof-rack. The apparatus includes at least one longitudinal adjustment rail which is attached to the bottom of the ski-box. The rail includes at least one load carrier clamp which is displaceable along the longitudinal adjustment rail to secure the longitudinal adjustment rail and ski-box attached thereto to a load carrier member of roof-rack.

16 Claims, 2 Drawing Sheets

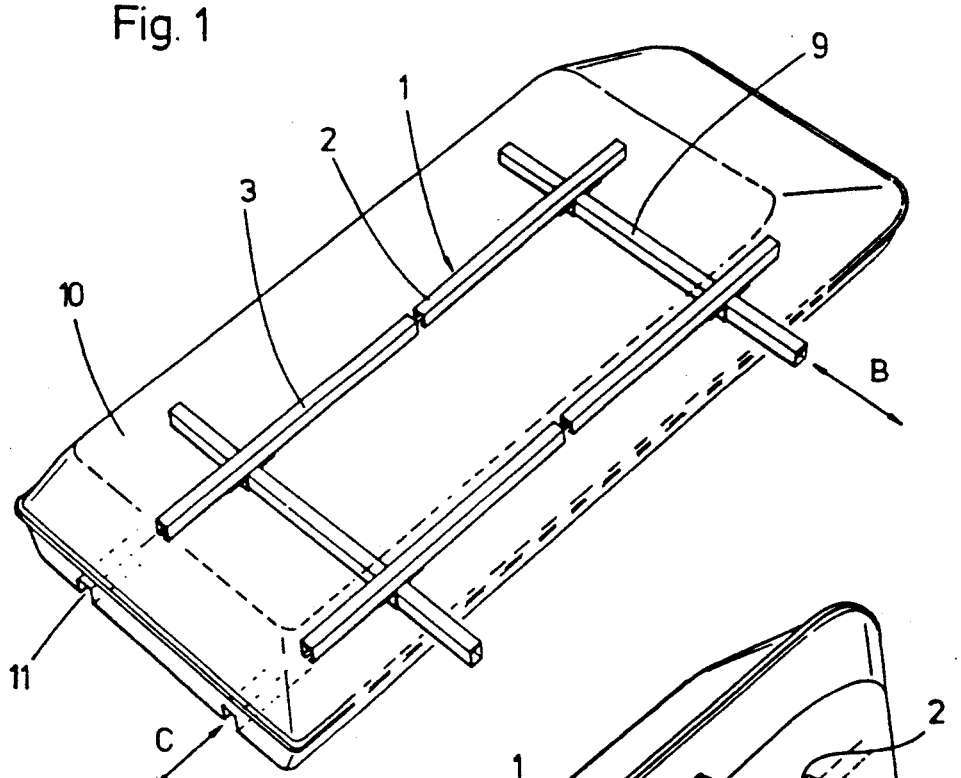
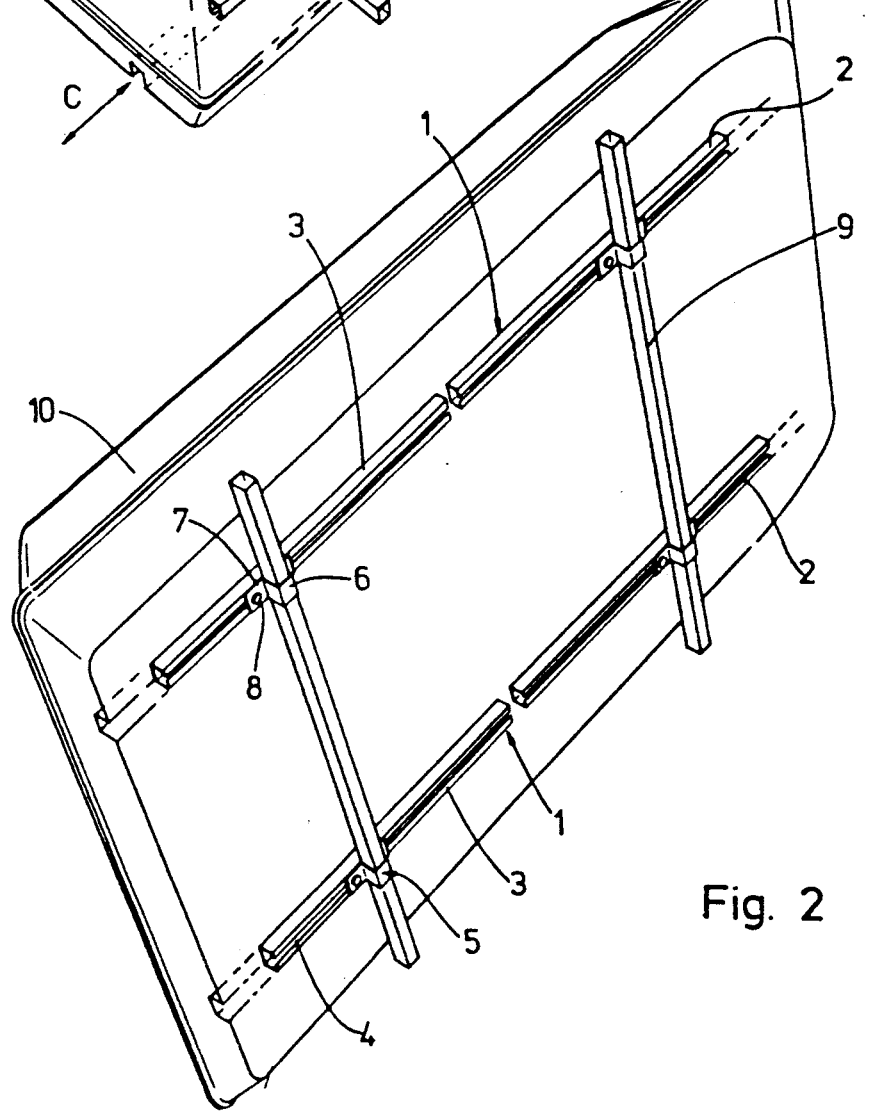

SKI BOX ATTACHMENT

The present invention relates to a device for attaching a ski-box to a roof-rack.

Prior Art roof-racks or luggage rails include those of the type comprising two separate racks that are positioned on the roof of the vehicle at a distance from each other in the longitudinal direction of the vehicle are used, for supporting a load, such as a transport or ski-box, on the roof of a vehicle. Each such rack consists of two feet or supports for attachment to the respective side of the vehicle roof and a load carrying bar, preferably of square tube, which connects the supports and on which the load is intended to be supported. The problems in connection with attaching ski-boxes to a roof-rack structure of this kind are that the positioning of the separate load carrying bars varies from vehicle to vehicle, and that it must likewise be possible to vary the positioning of the ski-box on the roof-rack from one vehicle to another, for instance in order to make sure that the boot lid of the vehicle may be opened without interfering with the ski-box. In other words, when attaching the ski-box it must be possible to arrange the parts of the roof-rack structure at different mutual distances and also to adjust the position of the ski-box forwardly or rearwardly in relation to the roof-rack structure.

Conventionally this problem has been solved by providing transverse channels in the bottom or underside of the ski-boxes. The load carrier bars of the roof-rack structure have been positioned in said channels, whereby the channels have been provided with such a width, i.e. in the longitudinal direction of the vehicle with the ski-box attached, that the combination of the load carrier bars and channels facilitate the adjustment of the position of the ski-box in relation to the roof-rack structure. However, this solution has several disadvantages. First of all the transverse channels are in themselves indications of fracture reducing the strength of the ski-box, and moreover the transverse channels give the underside of the ski-box an unsuitable shape causing turbulence and thus increased air-resistance. Moreover these channels do only allow for a limited adjustment determined by the width of the channels. In order to increase the possibility of adjustment several alternative, transverse channels have in some cases been provided, but this also means that the underside of the ski-box is given an even more unsuitable shape.

The object of the present invention is therefore to provide an apparatus for attaching a ski-box to a roof-rack, permitting alternative positioning of the load carrier rods of the roof-rack and adjustment of the position of the ski-box in the longitudinal direction as well as in the transverse direction, while at the same time eliminating the above discussed disadvantages of the prior art solutions.

Said object is achieved by means of an apparatus of the kind described herein.

Preferred further developments of the apparatus according to the invention are also described herein.

Figure 4:
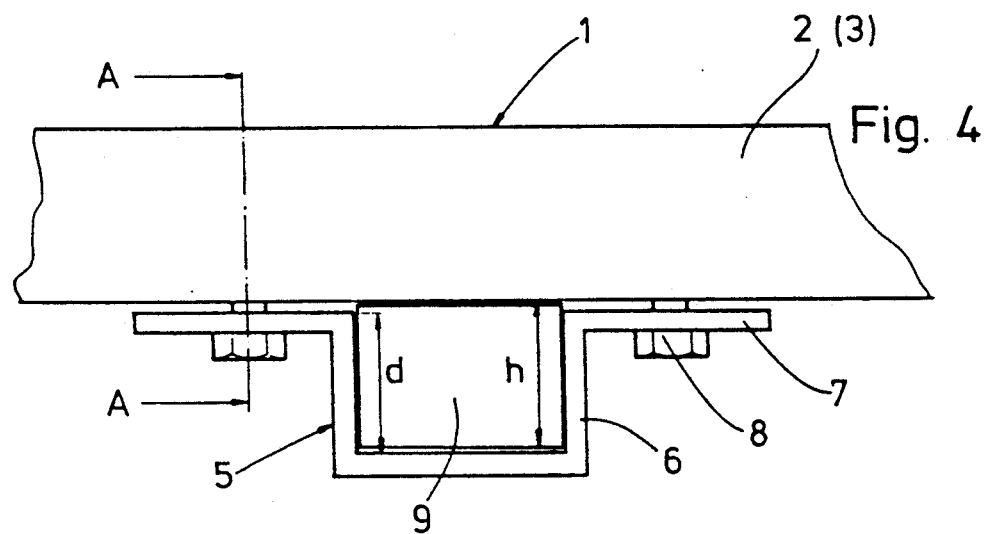
Figure 5:
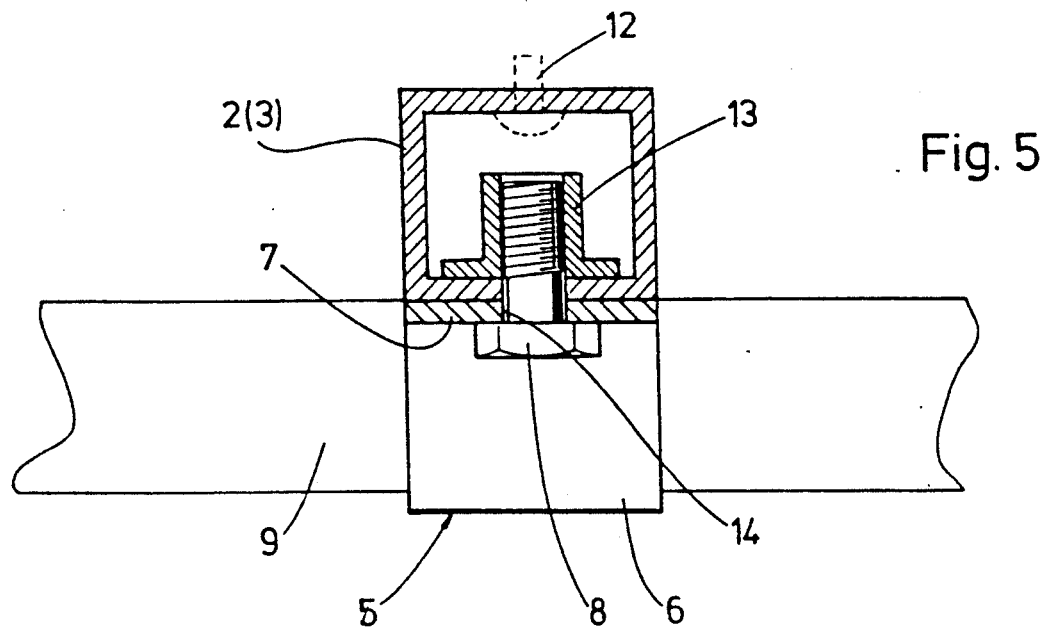

An exemplary embodiment of the invention will be described more closely below, in connection with the enclosed drawings, on which:

FIG. 1 illustrates the apparatus according to the invention in a perspective view from above and attached to a schematically illustrated ski-box, FIG. 2 illustrates the apparatus according to the invention in a perspective view from below, attached to a ski-box which is merely indicated, FIG. 3 illustrates an end view of a ski-box attached to a schematically indicated load carrier by means of the apparatus according to the invention, FIG. 4 is a partial side view of a longitudinal adjustment rail with mounted load carrier clamp, before tightening the mounting bolt, and FIG. 5 illustrates a cross-section along line A—A of FIG. 4.

As is clear from especially FIGS. 1 and 2 the apparatus according to the invention basically consists of a longitudinal adjustment rail 1 which is attached to the bottom or underside of a ski-box 10 for instance by means of rivets 12 and preferably in a longitudinal channel 11 formed in the bottom or underside of the ski-box. In the illustrated embodiment two parallel longitudinal adjustment rails 1 are employed which are provided in their own longitudinal channel 11, but it is also possible within the scope of the invention to employ only one longitudinal adjustment rail 1 for very narrow ski-boxes.

FIGS. 1 and 2 also illustrate that in the preferred embodiment the longitudinal adjustment rail 1 consists of two rail portions 2 and 3 which are aligned one after the other in the channel 11, at a small distance from each other. The purpose of this is to prevent tension caused by movements in the plastic material of the ski-box.

With reference to FIGS. 1 and 2 and especially to FIG. 5 it is apparent that the rail portions 2 and 3 consist of square steels at one side thereof being provided with a longitudinal groove 4 which in the illustrated embodiment extends along the full length of the rail portions 2 and 3. This embodiment having a continuous, open ended groove 4 permits a specifically simple mounting of the load carrier clamps 5—will be described more closely below—since these together with their fastening devices 8 and 13 may be pushed in from one end of the rail portions 2 and 3. However, it is also quite conceivable within the scope of the invention to provide the grooves along a limited portion of the side of the rail portions facing downwardly in the mounted condition. However, in such a case special fastening devices will have to be used for fastening the clamp 5, for instance nuts having a shape corresponding to the inner dimensions of the rail portions 2 and 3, said nuts being inserted into the rail portions 2 and 3 from their outer ends before the mounting of the clamps.

With specific reference to FIG. 2 it is clear that the apparatus according to the invention also comprises mounting clamps 5 for mounting the ski-box 10 to load carrier members 9 of a roof-rack which is not illustrated in detail. More specifically such a mounting clamp 5 is employed at each rail portion 2 and 3 of the respective longitudinal adjustment rail 1. FIGS. 4 and 5 specifically illustrate that each clamp 5 consists of a U-shaped portion 6 for receiving the load carrier 9 and two mounting flanges 7 extending outwardly at a right angle from the free end of the respective leg of the U-shape 6. In the respective mounting flange 7 a bore 14 is provided for receiving a mounting bolt 8 which is inserted through the bore 14 and through the groove 4 of the rail portions 2 and 3 and into engagement with a nut 13 displaceably provided within the rail portions.

Regarding the dimensioning of the mounting clamp 5 it is essential for achieving a firm attachment to the load carrier 9 that the internal depth d of the U-shaped portion 6 of the clamp 5 is slightly smaller than the external height h of the load carrier 9, such that the load carrier 9 is firmly clamped between the mounting clamp 5 and the respective rail portion 2 and 3 when the mounting bolt 8 is tightened.

In view of what has been described above it is now obvious that the clamps 5 are mounted in the respective rail portion 2 and 3 by inserting the bolts 8 through the bores 14 of the mounting flanges 7 and by bringing them into a slight engagement with the nuts 13, whereupon the clamps are pushed onto the respective longitudinal adjustment rail 1 from the free end of the respective rail portion 2 and 3, with the nuts 13 positioned within the rails and with the shafts of the bolts 8 guided in the grooves 4 of the rails. In this condition, illustrated in FIG. 4, with the bolts 8 only in slight or loose engagement with the nuts 13 the clamps 5 are displaceably supported in the rails 1 and the load carriers 9 of the roof-rack are displaceably supported in the U-shaped portion 6 of the clamps 5. With the roof-rack attached to the vehicle it is now possible to adjust the ski-box on the one hand in the direction of the arrows C of FIG. 1, i.e. in the longitudinal direction of the vehicle, by displacing the clamps 5 relative to the rails and, on the other hand, in the direction of the arrows B of FIG. 1, i.e. in the transverse direction of the vehicle, due to the fact that the clamps 5 may be displaced relative to the load carrier members 9. When the ski-box 10 has been adjusted to the desired position on the roof of the vehicle, the bolts 8 are tightened such that the clamps 5 on the one hand are fixed relative to the rail portions 2 and 3 and, on the other hand, are fixed relative to the load carriers 9, due to the fact that these, as mentioned above, are clamped between the U-shaped portion 6 of the clamps 5 and the respective rail portion 2 and 3.

It is evident in view of the above that by means of the apparatus according to the invention a very favourable attachment of the ski-box to a roof-rack is achieved, since the ski-box may be positioned optionally on the roof-rack and thus on the roof of the vehicle, and this independently of the distance between the load carriers of the roof-rack. Accordingly this attachment device is universely applicable for all possible roof-rack positions within reasonable limits. Moreover, the attachment device according to the invention provides the advantage of making the transverse channels, common on conventional ski-boxes, quite superfluous so that the ski-boxes may be given a suitable shape as far as their strength and reduced air-resistance are concerned. The longitudinal channels employed for receiving the longitudinal adjustment rails do in fact, contrary to the transverse channels, not cause any serious indications of fracture but do instead stiffen the box, and moreover they do not have any negative influence on the air-resistance.

Although the invention has been described above with specific reference to an advantageous embodiment thereof it should be obvious that the invention also comprises modifications and variations thereof which are obvious to a man skilled in the art. Therefore, the invention shall only be delimited by the enclosed patent claims.

I claim:

1. Apparatus for attaching a ski-box (10) to a roof-rack, having at least one longitudinal adjustment rail (1) for attachment to the bottom of a ski-box (10), in a longitudinal direction of the ski-box, and having at least one load carrier clamp (5) being displaceable longitudinally along the at least one longitudinal adjustment rail and being securable thereto for adjustably and securably receiving a load carrier member (9) of a roof-rack, said at least one longitudinal adjustment rail (1) being provided with a longitudinal groove (4) in which the at least one load carrier clamp (5) is displaceably guided and the at least one load carrier clamp (5) being formed of a U-shaped portion (6) for receiving the load carrier member (9) of the roof-rack and two mounting flanges (7) extended at a right angle outwardly from an end of a respective leg of the U-shaped portion (6), wherein at least one longitudinal adjustment rail (1) is provided with two displaceable and securable load carrier clamps (5) for adjustably and securably receiving front and rear load carrier members (9) respectively of the roof-rack, in that the load carrier clamps (5) are attached to the at least one longitudinal adjustment rail (1) by means of bolts (8) received in bores (14) of the mounting flanges (7) and extended into the longitudinal groove (4) of the at least one longitudinal adjustment rail (1) and engaged by nuts (13) displaceably provided within the at least one longitudinal adjustment rail (1), and in that internal depth (d) of the U-shaped portion (6) of the load carrier clamp (5) is smaller than external height (h) of the load carrier member (9), whereby a tightening of the bolts (8) of the respective load carrier clamp (5) causes on the one hand a clamping of the load carrier clamp (5) against the at least one longitudinal adjustment rail (1) and, on the other hand, a clamping of the load carrying member (9) between the load carrier clamp (5) and the at least one longitudinal adjustment rail (1).

2. Apparatus according to claim 1, wherein the at least one longitudinal adjustment rail (1) consists of two separate, aligned rail portions (2, 3) of which each supports one load carrier clamp (5).

3. Apparatus according to claim 1, wherein the at least one longitudinal adjustment rail (1) is formed of a square tube of which one side is intended for abutting the underside of the ski-box (10), whereby the opposite side of the square tube is provided with the longitudinal groove (4) in which the load carrier clamps are displaceably guided.

4. Apparatus according to claim 3, wherein longitudinal groove (4) extends along the full length of the at least one longitudinal adjustment rail (1).

5. Apparatus according to claim 2, wherein the rail portions (2, 3) respectively are formed of a square tube of which one side is intended for abutting the underside of the ski-box (10), whereby the opposite side of the square tube is provided with the longitudinal groove (4) in which the load carrier clamps are displaceably guided.

6. Apparatus according to claim 5, wherein the longitudinal groove (4) extends along the full length of the rail portions (2, 3).

7. Apparatus according to claim 3, wherein the longitudinal groove (4) extends along a limited portion of the length of the at least one longitudinal adjustment rail (1).

8. Apparatus according to claim 5, wherein the longitudinal groove (4) extends along a limited portion of a length of the rail portions (2, 3).

9. Apparatus according to claim 1 wherein the at least one longitudinal adjustment rail includes two longitudinal adjustment rails (1).

10. Apparatus according to claim 9 wherein each of the two longitudinal adjustment rails (1) comprises two separate, aligned rail portions (2, 3) of which each supports one load carrier clamp (5).

11. Apparatus according to claim 9 wherein each of the two longitudinal adjustment rails (1) is formed of a square tube of which one side is intended for abutting the underside of the ski-box (10), whereby the opposite side of the square tube is provided with the longitudinal groove (4) in which the load carrier clamps are displaceably guided.

12. Apparatus according to claim 11 wherein the longitudinal groove (4) extends along the full length of the at least one longitudinal adjustment rail (1).

13. Apparatus according to claim 11 wherein the longitudinal groove (4) extends along a limited portion of the length of the at least one longitudinal adjustment rail (1).

14. Apparatus according to claim 10 wherein each of the rail portions (2, 3) respectively are formed of a square tube of which one side is intended for abutting the underside of the ski-box (10), whereby the opposite side of the square tube is provided with the longitudinal groove (4) in which the load carrier clamps are displaceably guided.

15. Apparatus according to claim 14 wherein the longitudinal groove (4) extends along the full length of each of the rail portions (2, 3).

16. Apparatus according to claim 14 wherein the longitudinal groove (4) extends along a limited portion of the length of each of the rail portions (2, 3).

* * * * *